(12) United States Patent
Jordan et al.

(10) Patent No.: US 6,454,511 B1
(45) Date of Patent: Sep. 24, 2002

(54) ADAPTIVE LOAD-CLAMPING SYSTEM

(75) Inventors: Dean Clark Jordan, Gresham, OR (US); Richard D. Seaberg, Brush Priarie, WA (US)

(73) Assignee: Cascade Corporation, Fairview, OR (US)

( * ) Notice: Subject to any disclaimer, the term of this patent is extended or adjusted under 35 U.S.C. 154(b) by 0 days.

(21) Appl. No.: 09/820,041

(22) Filed: Mar. 28, 2001

Related U.S. Application Data

(60) Division of application No. 09/388,181, filed on Sep. 1, 1999, which is a continuation-in-part of application No. 09/168,358, filed on Oct. 7, 1998.

(51) Int. Cl.$^7$ .............................. B66F 9/18; B66F 9/20
(52) U.S. Cl. ..................... 414/621; 414/674; 187/224; 294/907
(58) Field of Search ...................... 414/21, 621, 635, 414/636, 674; 294/88, 907; 187/223, 224; 901/34

(56) References Cited

U.S. PATENT DOCUMENTS

| | | |
|---|---|---|
| 3,438,308 A | 4/1969 | Nutter |
| 3,589,459 A | 6/1971 | Harvey |

(List continued on next page.)

FOREIGN PATENT DOCUMENTS

| | | |
|---|---|---|
| DE | 942349 | 5/1956 |
| DE | 2636473 | 2/1978 |
| DE | 3245715 | 9/1983 |
| EP | 498611 | 8/1992 |
| GB | 2312417 | 10/1997 |
| JP | 3082675 | 4/1991 |
| JP | 3293300 | 12/1991 |
| JP | 5-229792 | * 9/1993 | ................ 414/635 |
| JP | 5-238686 | 9/1993 |
| JP | 6-144795 | 5/1994 |

OTHER PUBLICATIONS

Auramo, "Mast Centralization System for Lift Trucks," at least as early as 1996.
Cascade Corporation, "Circuit Schematic Drawing No. 3XF–2141–015," Jan. 20, 1998.

*Primary Examiner*—James W. Keenan
(74) *Attorney, Agent, or Firm*—Chernoff, Vilhauer, McClung & Stenzel

(57) ABSTRACT

A fluid power load-clamping system includes at least one fluid valve for variably regulating the maximum fluid pressure causing closure of the clamp. Preferably the valve increases the maximum fluid pressure automatically in relation to the measured magnitude of the weight of the load to regulate the load-gripping force. A controller causes the valve to permit a relatively high maximum fluid pressure as the clamp closes toward the load to enable high initial clamp closure speed. Thereafter the valve automatically reduces the maximum pressure as the clamping surfaces close into a predetermined relationship with the load, and then increases the maximum pressure to regulate the gripping force. Other preferable features include continuous weight-responsive automatic regulation of the gripping pressure while the load is supported by the clamp, and compensation of the weight measurement for the longitudinally-extensible position of the lifting mechanism, to maximize the accuracy of the load-weight measurement. Gripping pressure regulation is operable in response to linear load-lifting or tilting load-lifting, without concurrent clamp closure actuation. Different predetermined relationships between the weight of the load and the maximum gripping pressure are selectable alternatively. A gravity-referenced tilt controller adjusts the load automatically to an attitude which is untilted with respect to gravity. Lowering of the lifting mechanism is automatically prevented in response to the setting down of the load.

4 Claims, 8 Drawing Sheets

U.S. PATENT DOCUMENTS

| | | |
|---|---|---|
| 3,865,424 A | 2/1975 | Jabkowski |
| 3,904,234 A | 9/1975 | Hill et al. |
| 3,905,635 A | 9/1975 | Esser |
| 3,990,594 A | 11/1976 | Olson et al. |
| 4,008,875 A | 2/1977 | Olson et al. |
| 4,221,530 A | 9/1980 | Williams, IV et al. |
| 4,285,626 A * | 8/1981 | Donato ........................ 414/674 |
| 4,517,645 A | 5/1985 | Yuki et al. |
| 4,520,443 A | 5/1985 | Yuki et al. |
| 4,605,354 A | 8/1986 | Daly |
| 4,621,331 A | 11/1986 | Iwata |
| 4,714,399 A | 12/1987 | Olson |
| 4,726,729 A | 2/1988 | Olson et al. |
| 4,730,862 A | 3/1988 | Caen et al. |
| 4,742,468 A | 5/1988 | Ohashi et al. |
| 4,783,106 A | 11/1988 | Nutter |
| 5,026,245 A | 6/1991 | Sabo |
| 5,292,219 A | 3/1994 | Merin et al. |
| 5,417,465 A | 5/1995 | Seaberg et al. |
| 5,462,136 A * | 10/1995 | Schoenmaker et al. ..... 187/223 |
| 5,738,187 A | 4/1998 | Dammeyer et al. |
| 6,027,302 A | 2/2000 | Nilsson |

\* cited by examiner

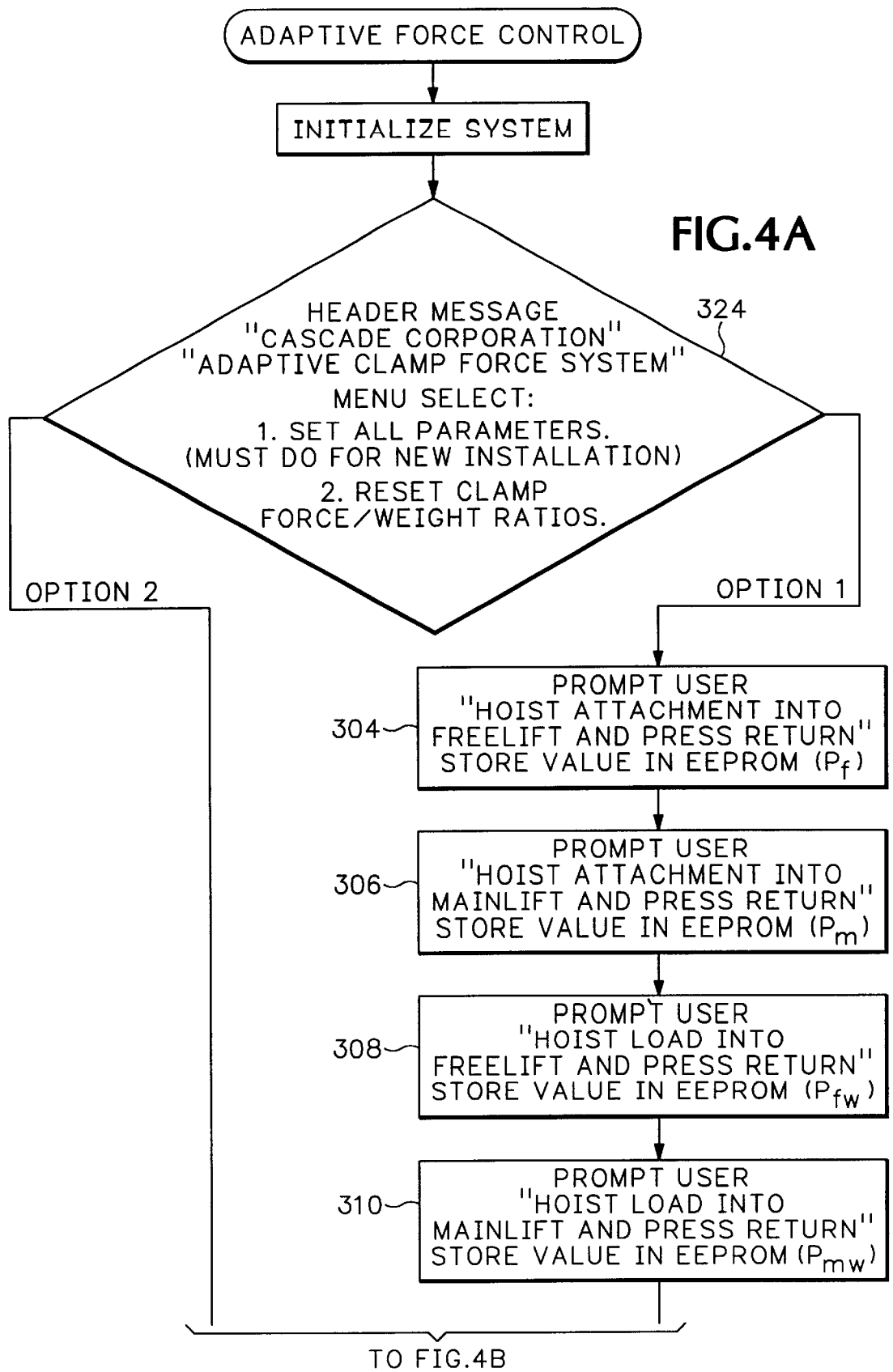

ADAPTIVE LOAD-CLAMPING SYSTEM

This is a division of patent application Ser. No. 09/388,181, filed Sep. 1, 1999, which is a continuation-in-part of patent application Ser. No. 09/168,358, filed Oct. 7, 1998, which is hereby incorporated by reference.

BACKGROUND OF THE INVENTION

The present invention relates to improvements in fluid power load-clamping systems for variably regulating maximum load gripping forces in a manner automatically adaptive to at least one characteristic of the load.

Various types of such adaptive load-clamping systems have been proposed in the past. Such previous systems can be categorized as follows:

(1) Systems which sense the existence of load slippage and respond automatically by gradually increasing the gripping force on the load by fixed force increments until the sensed slippage stops;

(2) Systems which automatically vary the gripping force in proportion either to the sensed weight or to the resistance to gripping of the load, without regard to whether or not slippage is actually occurring; and (3) Systems which perform a combination of (1) and (2).

Fluid power clamping systems of any of the above types regulate gripping force by gradually increasing gripping fluid pressure automatically from a relatively low threshold pressure. However such low threshold pressure limits the speed with which the load-engaging surfaces can be closed into initial contact with the load, thereby limiting the productivity of the load-clamping system. This problem occurs because high-speed closure requires higher closing pressures than the desired low threshold pressure, such higher pressures becoming trapped in the system by fluid input check valves during initial closure so that the desired lower threshold pressure is exceeded before automatic regulation of gripping pressure can begin. Although gripping pressure relief valve systems have in the past provided high and low relief settings selectable either manually, or automatically in response to clamp closure speed, to enable high-speed closure followed by low maximum gripping pressure, no such systems capable of automatically changing such settings in a manner compatible with automatic variable gripping pressure regulation have been known.

Prior fluid power systems such as those disclosed in British Patent Publication No. 2312417 and German Patent Publication No. 3245715, which vary the gripping fluid pressure in proportion to the sensed weight of the load, obtain weight measurements by lifting the load. However such weight-sensing systems operate only in response to clamp closure actuation, and therefore do not continue to vary the gripping fluid pressure in proportion to load weight during subsequent manipulation of the load in the absence of continued clamp closure actuation. Furthermore, such prior systems do not weigh the load in response to lifting of the load by tilting which, in paper roll handling operations, is a commonly-used alternative way to lift the load. The system shown in the British publication is also susceptible to inaccurate weight measurements due to variations in lifting pressure which are inherent within the extensible lifting mechanism depending upon its degree of extension.

Such prior weight-responsive systems also do not provide for different selectable predetermined relationships between the weight of the load and the gripping pressure, which are needed to account for variations in load fragility and stability.

Although automatic load tilt adjustment systems have been provided in the past for leveling fragile loads to prevent edge damage when the load is being set down, such automatic adjustment systems have not been capable of sensing the tilt of the load with respect to gravity, leading to inaccurate automatic tilt adjustment depending on whether or not an industrial lift truck is level with respect to its supporting surface, or whether or not such surface is level.

Valves for automatically preventing excessive lowering of the lifting mechanism when a clamped load is set down, to prevent subsequent damage to fragile load surfaces by downward slippage of the clamp when it is opened to disengage the load, have been provided in the past as shown, for example, in U.S. Pat. No. 3,438,308. However, such previous systems lack the versatility needed for reliable protection of the load under variable circumstances, such as variations in the degree of extension of the lifting mechanism when the load is set down.

BRIEF SUMMARY OF THE INVENTION

In one preferred aspect of the invention, a controller automatically enables high initial clamp closure speed prior to automatic gripping pressure regulation by initially permitting relatively high fluid pressure to close the clamp, followed by an automatic reduction in the maximum fluid pressure as the clamping surfaces close into a predetermined relationship with the load, followed by an increase in the maximum fluid pressure pursuant to automatic maximum gripping pressure regulation.

In another separate preferred aspect of the invention, the load-weight measurement is compensated to account for variations in extension of the lifting mechanism, also to maximize the accuracy of the load-weight measurement.

In another separate preferred aspect of the invention, automatic weight-responsive gripping pressure regulation is operable without concurrent clamp closure actuation.

In another separate preferred aspect of the invention, automatic weight-responsive gripping pressure regulation is operable in response to lifting of the load solely by tilting.

In another separate preferred aspect of the invention, different predetermined relationships between the weight of the load and the maximum gripping pressure are selectable alternatively.

In another separate preferred aspect of the invention, a gravity-referenced tilt controller automatically adjusts the load to an attitude which is untilted with respect to gravity.

In another separate preferred aspect of the invention, an improved system is provided for automatically preventing further lowering of the lifting mechanism when the load is set-down.

In another separate preferred aspect of the invention, the speed of lowering of the lifting mechanism is limited automatically to aid the accuracy of the lowering prevention system.

The foregoing and other objectives, features, and advantages of the invention will be more readily understood upon consideration of the following detailed description, taken in conjunction with the accompanying drawings.

BRIEF DESCRIPTION OF THE SEVERAL VIEWS OF THE DRAWINGS

FIGS. 4A–4F are an exemplary simplified logic flow diagram of an initialization sequence, a load clamping sequence, and a disengagement sequence utilized by the microprocessor-based controller in the circuit of FIG. 3.

DETAILED DESCRIPTION OF THE PREFERRED EMBODIMENT

Figure 1:
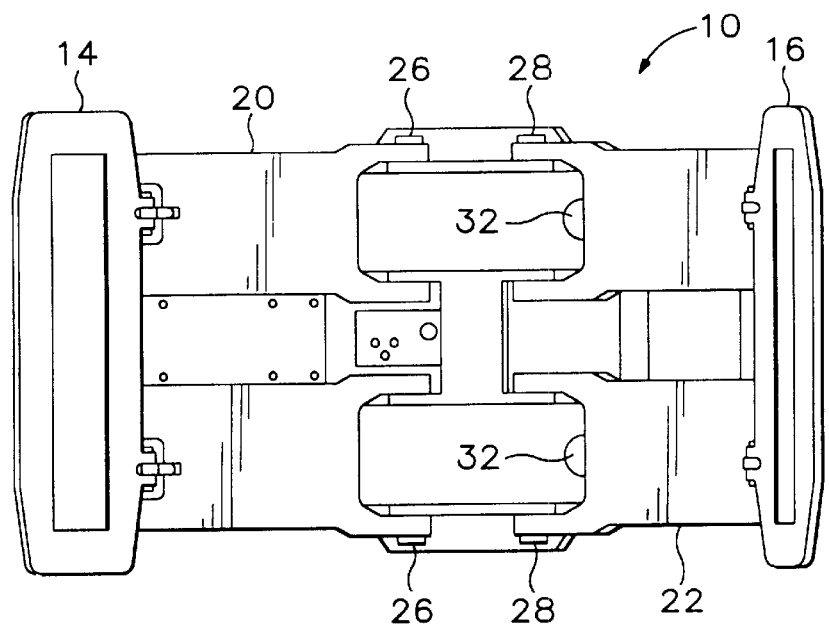
FIG. 1 is a front view of an exemplary embodiment of a fluid-powered load-handling clamp in accordance with the present invention.
Figure 2:
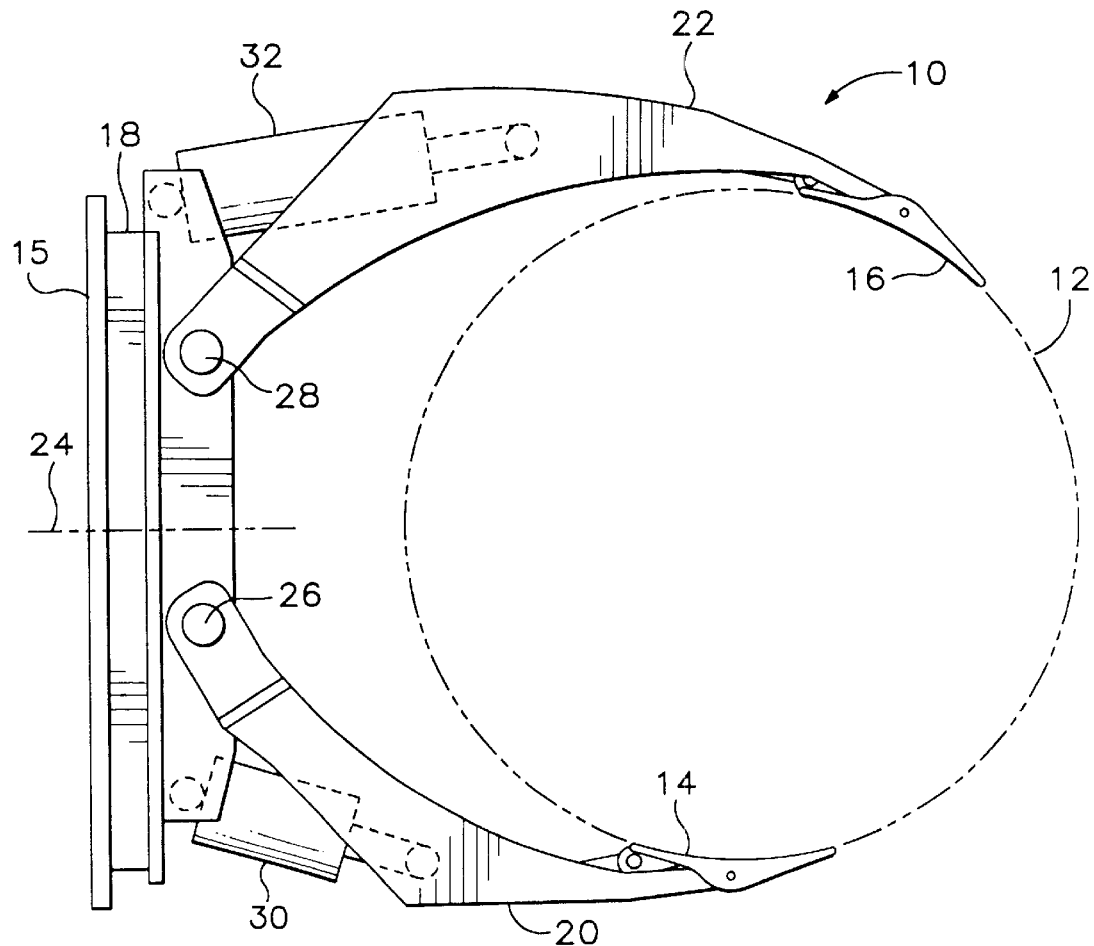
FIG. 2 is a top view of the load-handling clamp of FIG. 1.

An exemplary embodiment of a load-handling clamp in accordance with the present invention is indicated generally as 10 in FIGS. 1 and 2. The exemplary clamp 10 is a hydraulically-powered, pivoted-arm clamp having a base 15 adapted for mounting on a lift truck carriage which is selectively reciprocated linearly along an upright hydraulically-powered load-lifting mast indicated schematically as 11 in FIG. 3. The mast is selectively tiltable forwardly and rearwardly by a pair of tilt cylinders such as 13 in FIG. 3. The particular clamp 10 depicted in the drawings is for handling large paper rolls such as 12 in FIG. 2 used in the publishing and paper industries which, if deformed excessively as a result of overclamping to prevent slippage, will become too distorted for use on the high-speed printing presses or other machinery for which they are intended. On the other hand, under-clamping can cause the paper roll 12 to slip from the frictional grasp of the clamp 10, particularly when the load-engaging surfaces 14 and 16 of the clamp 10 are oriented vertically by the clamp's rotator 18 which rotates the respective clamp arms 20 and 22 relative to the base frame 15 about an axis 24 (FIG. 2). Although the hydraulically-operated paper roll clamp 10 is described herein as the preferred embodiment, the present invention is also applicable to many other types of load clamps. For example, clamps in accordance with the present invention could alternatively have sliding rather than pivoted arms, and could handle rectilinear rather than round loads.

Each of the clamp arms 20 and 22 is rotatable about its respective pivot pins 26, 28 selectively toward or away from the other clamp arm by the selective extension or retraction of respective pairs of hydraulic cylinders 30 and 32 associated with the respective arms 20 and 22. The cylinders 30 which actuate the shorter clamp arm 20 are primarily used only to position the clamp arm 20 in advance for carrying rolls 12 of different diameters and different desired lateral positions. Therefore, closure of the clamp arms and their load-engaging surfaces to grip the load is normally accomplished solely by movement of the clamp arm 22 in response to extension of the cylinders 32. In some clamps, the shorter clamp arm 20 could be fixed, and the cylinders 30 eliminated. In other clamps, particularly those with sliding arms, closure would normally be accomplished by moving both clamp arms simultaneously toward each other. Moreover, closure may be caused by retraction of cylinders instead of extension thereof.

Figure 3:
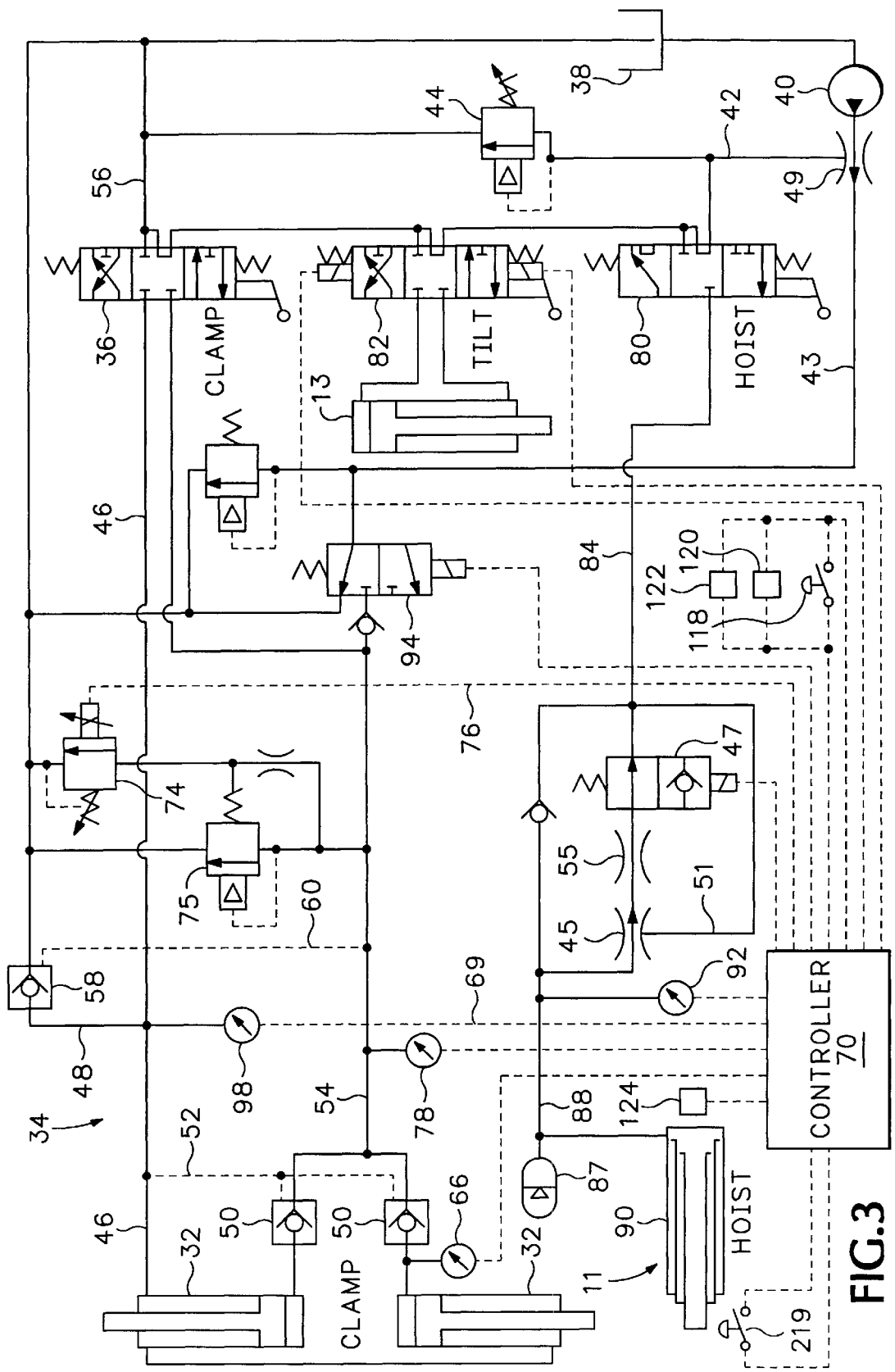
FIG. 3 is a schematic diagram of an exemplary electro-hydraulic circuit for the clamp of FIG. 1.

With reference to FIG. 3, hydraulic clamping cylinders 32 are controlled through hydraulic circuitry indicated generally as 34 to receive pressurized hydraulic fluid from the lift truck's reservoir 38 through a pump 40 and supply conduits 42 and 43. Safety relief valve 44 opens to shunt fluid back to the reservoir 38 if excessive pressure develops in the system.

A priority flow control valve 49 insures that a predetermined priority flow, for example one gallon per minute, of fluid is diverted to conduit 43 before excess flow is permitted to conduit 42. The priority flow in conduit 43 is for automatic gripping pressure regulation, while the excess flow in conduit 42 supplies manually actuated load-clamping and hoisting selector valves 36 and 80 respectively, as well as a tilt control valve 82.

The clamp control valve 36 is controlled selectively by the operator to cause the cylinders 32 to open the clamp arms and to close the clamp arms into initial contact with the load 12. To open the clamp arms, the spool of the valve 36 is moved downwardly in FIG. 3 so that pressurized fluid from line 42 is conducted through line 46 to the rod ends of cylinders 32, thereby retracting the cylinders 32 and moving the clamp arm 22 away from the clamp arm 20. Pilot-operated check valves 50 are opened by the pressure in line 46 communicated through pilot line 52, enabling fluid to be exhausted from the piston ends of cylinders 32 through line 54 and valve 36 to the reservoir 38 as the cylinders 32 retract. Alternatively, to close the clamp arms, the spool of the valve 36 is moved upwardly in FIG. 3 so that pressurized fluid from line 42 is conducted through line 54 to the piston ends of cylinders 32, thereby extending the cylinders 32 and moving the clamp arm 22 toward the clamp arm 20. Fluid is exhausted from the rod ends of the cylinders 32 to the reservoir through line 46 via the valve 36.

During closure of the clamp arms by extension of the cylinders 32, the maximum closing pressure in the line 54 is preferably regulated by a pilot controlled modulating pressure regulator valve assembly 75 of which the pilot control is by variably controlled relief valve assembly 74. The variable relief valve assembly 74 preferably comprises a single relief valve whose relief setting is infinitely proportional to a variable signal received from the controller 70 through signal line 76. Alternatively, the maximum closing pressure could be regulated by single or multiple relief valve and/or regulator valve assemblies with different settings automatically selectable by a signal from the controller 70, or by an automatically-variable pressure-reducing valve assembly having one or more pressure-reducing valves in series with line 54 whose output pressure settings are variably regulated by the controller 70.

Figure 4B:
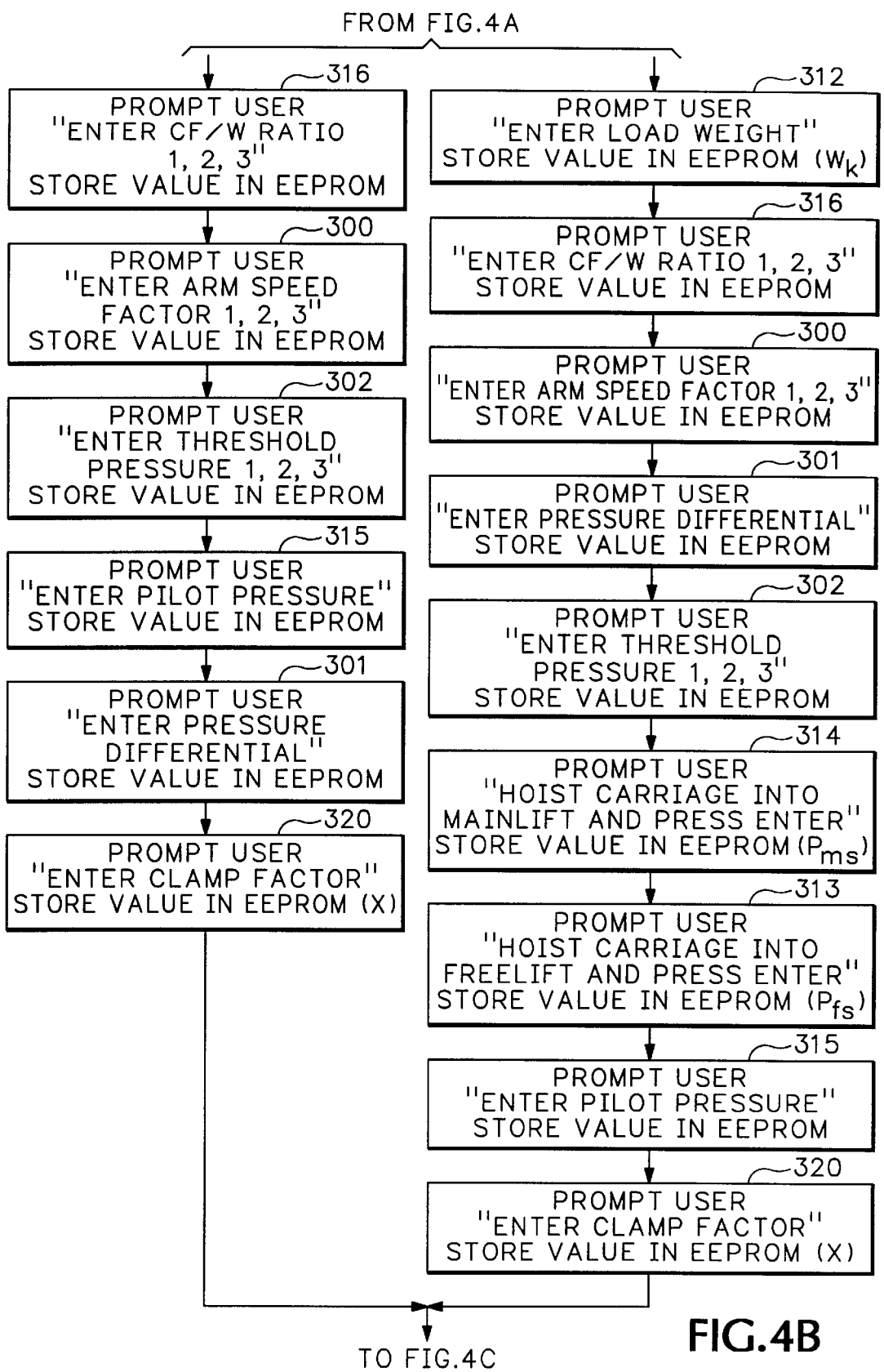
Figure 4C:
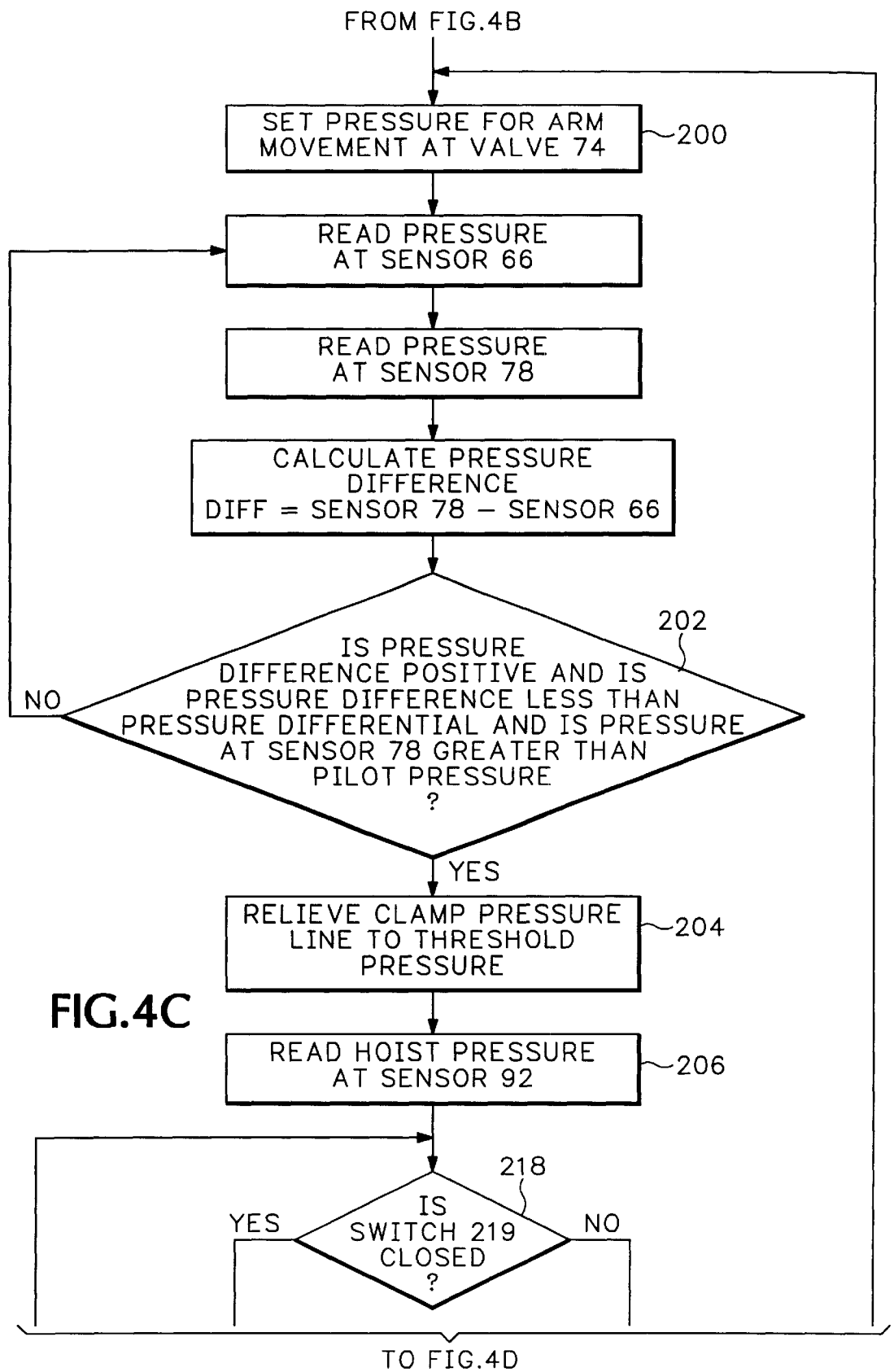
Figure 4D:
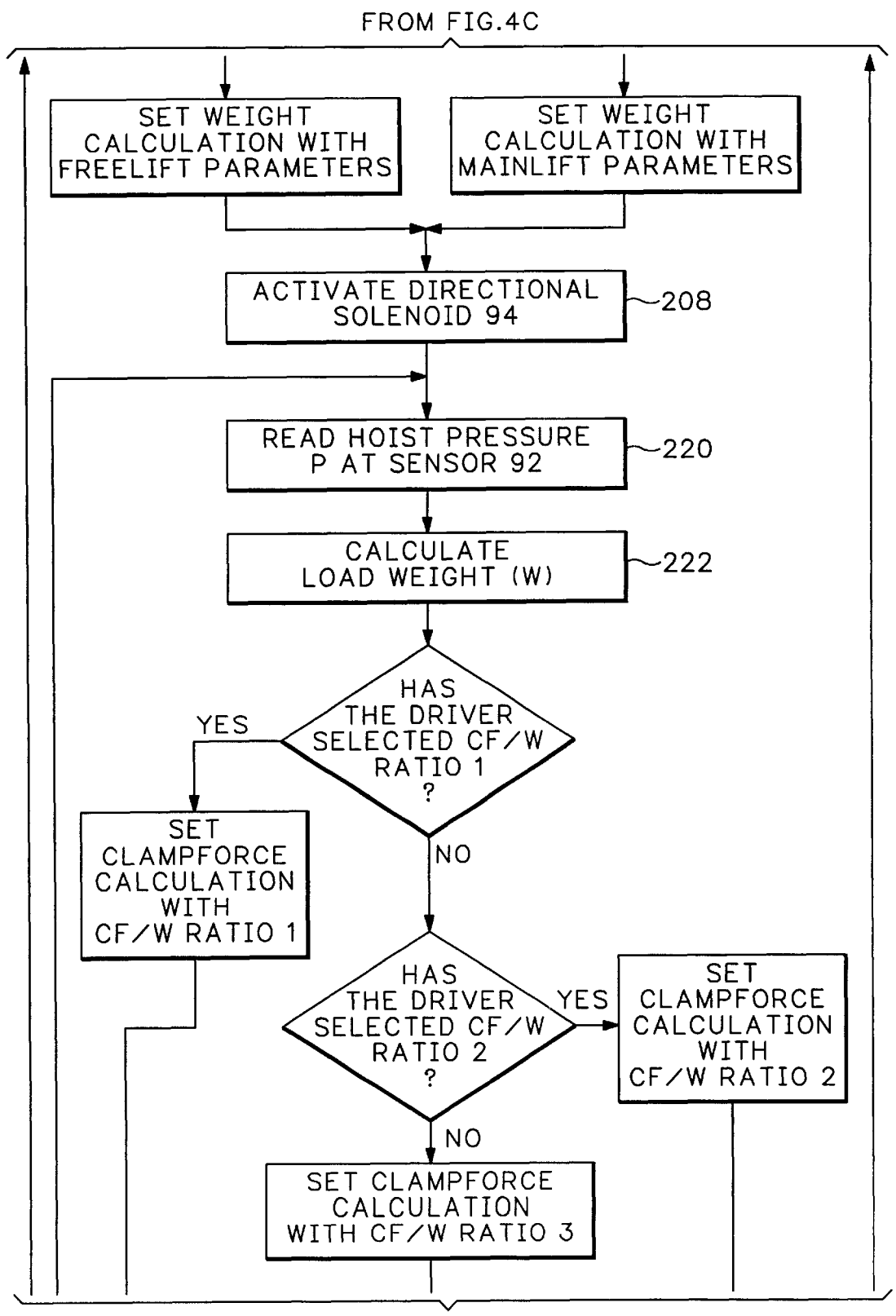
Figure 4E:
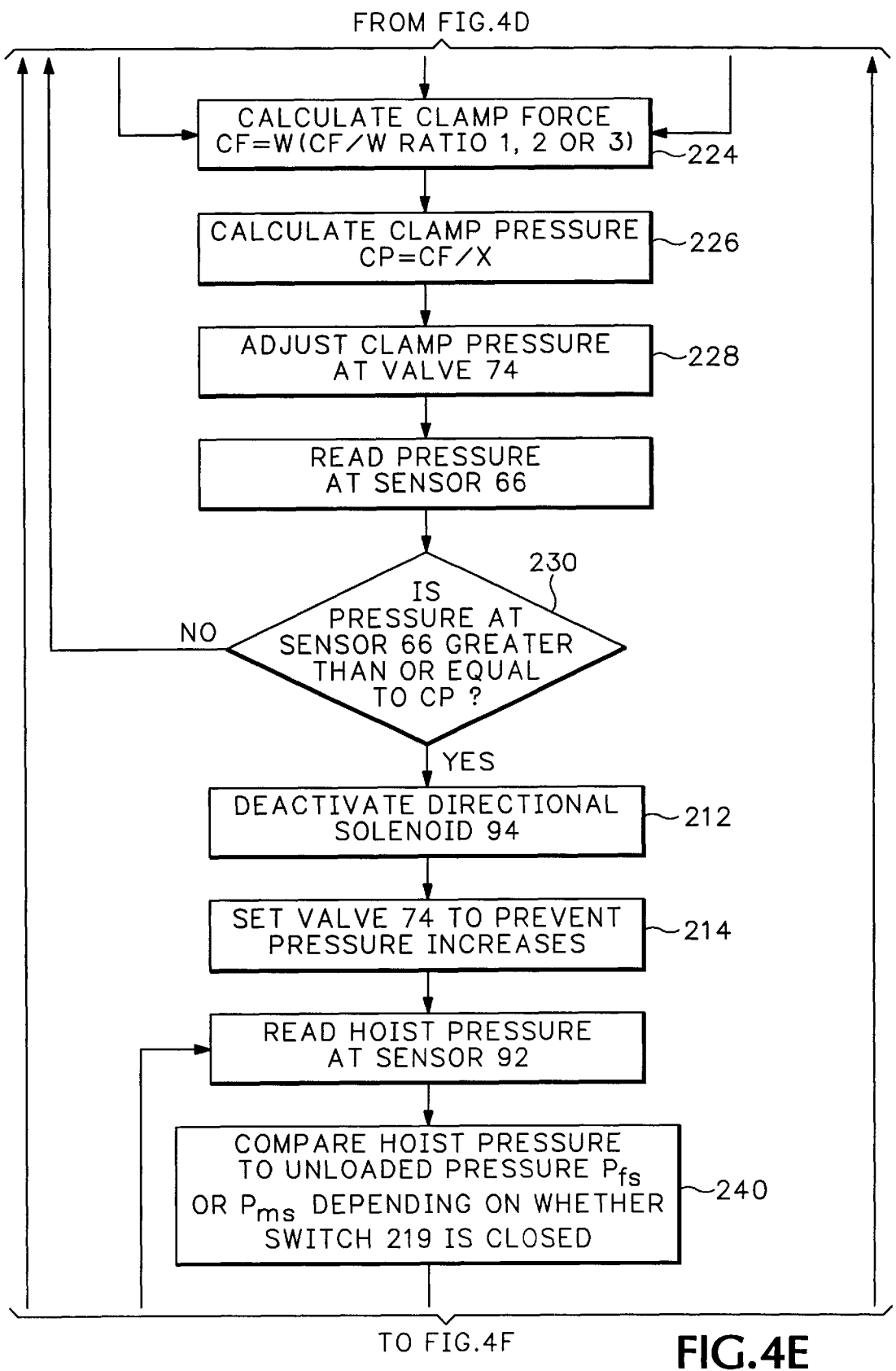

As the clamp arms are closed toward the load, the controller 70 operates in accordance with the steps of FIGS. 4C–4E, and in accordance with the initialization values previously entered into the controller 70 by the operator pursuant to FIGS. 4A and 4B using keyboard switches such as 118. Appropriate portions of these figures will be referenced in the following operational description of the clamp.

During initial clamp arm closure, the controller 70 sets the variable relief pressure of the valve assembly 74, as indicated at step 200 of FIG. 4C, at a relatively high level previously selected by the operator at step 300 of the initialization sequence of FIG. 4B from among three alternative levels "1, 2, 3." Such pressure level enables high-speed closure of the clamp arms toward the load prior to actually gripping the load. Thereafter, in response to contact of the load-engaging surfaces of the clamp arms with the load, the clamp-closing pressure in line 54 as sensed by pressure sensor 78 increases above a minimum pilot pressure level previously selected by the operator at step 315. At the same time the volumetric flow rate in line 54 decreases and causes a corresponding decrease in the positive differential, between the pressure reading by the pressure sensor 78 and the reading by the pressure sensor 66, to a differential value below that previously selected by the operator at step 301 of the initialization sequence of FIG. 4B. In response to such changes, reflecting a predetermined resistance by the load to further closure of the arms, the controller 70 at steps 202 and 204 of FIG. 4C immediately reduces the relief setting of the relief valve assembly 74 to a relatively low threshold level previously selected by the operator from among three alternatives at step 302 of FIG. 4B. This decreases the pressure, between the pilot-operated check valves 50 and the cylinders 32, to the reduced relief setting so that the high-speed initial closing pressure is not maintained between the check valves 50 and the cylinders 32. Such reduced pressure is the threshold gripping pressure from which subsequent increases in gripping pressure will be automatically regulated as described below.

Instead of reducing the closing pressure in response to load resistance as described, other predetermined relationships between the load and the load-engaging surfaces could trigger the pressure reduction, such as a predetermined proximity therebetween.

After the desired threshold gripping pressure is established at step 204, the operator moves the valve 36 to its centered, unactuated position and begins to lift the load, either by manually actuating the hoist-control valve 80 to move the load linearly upward, or by manually actuating the tilt control valve 82 to tilt the load rearwardly.

In the case of the hoist valve 80, its spool is moved upwardly to lift the load and downwardly to lower the load as seen in FIG. 3. When the valve 80 is actuated to lift the load, the valve 80 conducts pressurized fluid from line 42 through lines 84 and 88 to the base of one or more hoist cylinders, schematically indicated as 90, of the mast 11. A pressure sensor 92 senses a resultant increase in pressure in line 88 and signals the controller 70 that lifting has begun, as indicated at step 206 of FIG. 4C. In response, the controller actuates solenoid valve 94, as indicated at step 208 of FIG. 4D, by moving its spool upwardly in FIG. 3 so that the priority flow in line 43 can flow through line 54 to the cylinders 32 to further close the clamp arms.

The controller 70 senses the magnitude of the weight of the load through the signal from the pressure sensor 92, and adjusts the relief setting of the valve assembly 74 upwardly in a predetermined relation to the sensed magnitude of the load weight in a manner to be explained more fully hereafter. Since solenoid valve 94 is actuated, this increases the maximum fluid gripping pressure in line 54 in a predetermined relation to the magnitude of the load weight. The cushioning effect of accumulator 87 minimizes dynamic effects on the load-weight measurement and thereby maximizes the accuracy of such measurement. If necessary, a restrictor (not shown) in the line 88 can be optionally included to limit lifting speed and thereby further minimize dynamic effects.

After the foregoing maximum fluid gripping pressure has been achieved, the controller 70 deactivates the solenoid valve 94 as indicated at step 212 of FIG. 4E, moving the spool of the valve downward in FIG. 3 so that automatic gripping pressure regulation ceases. The valve 74 is set by the controller 70 to prevent any further gripping pressure increases which might otherwise result from the operator's manipulation of valve 36, as indicated by step 214 in FIG. 4E. Thereafter, the system begins continuous monitoring of the fluid gripping pressure relative to the sensed load weight and, if necessary, readjusts the gripping pressure as explained more fully hereafter.

Alternatively, the operator's manual actuation of the tilt control valve 82 to tilt the load rearwardly and thus lift it, by moving the spool upwardly in FIG. 3, also initiates the foregoing load-weighing and pressure-regulating operation in the same manner, since the pressure sensor 92 will sense a resultant increase in pressure in line 88 due to the lifting of the load and will initiate the above-described sequence beginning with step 206.

It will be recognized that sensors other than fluid pressure sensors 66, 78 and 92 could be used. For example, flow meters and/or electromechanical force sensors could be substituted as appropriate.

During the above described load-weighing and pressure-regulating operation, increased fluid gripping pressure causes some extension of the clamping cylinders 32, requiring the exhaust of some fluid through line 46 from the rod ends of the cylinders 32. Since the clamp control valve 36 would normally be centered during such operation, such fluid is exhausted to the reservoir 38 through a parallel line 48 and pilot operated check valve 58 which is opened by the pressure in line 54 transmitted through pilot line 60.

The accuracy of the load-weight measurement is enhanced by compensating for variations in extension of the mast 11 which vary the pressure reading of the sensor 92. Such pressure variations can result from multiple causes, such as changes in effective pressure areas of the hoist cylinder or cylinders 90, or the fact that telescopic sections of the mast 11 may or may not be supported by the hoist cylinder or cylinders 90, depending upon whether the mast is in its lower "freelift" range of extension or in its higher "mainlift" range of extension. To account for these variables, as well as variables in the load-handling clamps that might be mounted interchangeably on the mast, the controller 70 is initialized according to FIGS. 4A and 4B to calibrate the load-weighing system with respect to such variables. Such initialization includes reading and storing the respective pressures sensed by the sensor 92 in both the freelift and mainlift ranges of extension of the mast while dynamically lifting the load-handling clamp, both without a load as shown in steps 304 and 306 of FIG. 4A to obtain $P_f$ and $P_m$ respectively, and with a load of known weight as shown in steps 308 and 310 to obtain $P_{fw}$ and $P_{mw}$ respectively. The controller 70 also reads respective pressures $P_{fs}$ and $P_{ms}$ sensed by sensor 92 with no load in the freelift and mainlift ranges, respectively, under static conditions, i.e. in the absence of dynamic lifting, and stores the pressures as indicated at steps 313 and 314 of FIG. 4B. Furthermore, the controller stores the known load weight $W_k$ as indicated at step 312 in response to operator entry using keyboard switches such as 118. Other operator entries using keyboard switches include one or more desired clamp-force-to-load-weight ratios CF/W ratio 1, 2, 3, as indicated at step 316, and a "clamp factor" X at step 320 representing the total effective pressure area of the combined clamping cylinders 32 multiplied by the efficiency percentage of the clamp cylinders 32. Such efficiency percentage corresponds to the ratio of the clamp force generated by the load-engaging surfaces 16 (after frictional and other mechanical losses) to the product of the effective pressure area of the combined clamping cylinders 32 and the applied fluid pressure.

As indicated at step 324 at the beginning of the initialization process of FIG. 4A, all of the foregoing parameters need be entered only for new installations or changes of load-handling clamps or masts. Otherwise, only the shorter list of entries designated as "Option 2" in FIG. 4 need be entered, or no entries if the operator does not wish to change any listed parameter.

Returning to the load-clamping sequence of FIGS. 4C–4E, the controller 70 controls the load-weight measurement and gripping pressure regulation processes by automatically accounting for the range of extension of the mast 11 (freelift or mainlift), different desired clamp-force-to-load-weight ratios, and the other variables mentioned in connection with FIGS. 4A and 4B. Immediately after clamp pressure is relieved at step 204 of FIG. 4C, the controller senses at step 218 whether a mechanical switch 219, responsive to the degree of extension of the mast 11, is closed. If the switch is closed, the controller 70 determines at step 218 that the mast is in its lower, or freelift, range of extension; otherwise the controller determines that the mast is in its higher, or mainlift, range of extension. Depending on such determination, the controller 70 sets the future load-weight calculation with parameters appropriate either for the freelift range of extension or the mainlift range of extension of the mast. After the actuation of solenoid 94 at step 208 in response to the operator's lifting of the load by actuation of the hoist valve 80 or the tilt valve 82 as previously described, the controller reads the lifting pressure P sensed by pressure sensor 92 as indicated at step 220, and at step 222 calculates therefrom the load weight W using the appropriate freelift or mainlift calculation.

For the freelift range of extension of the mast 11, the calculation is as follows:

$$W = \frac{(P - P_f)(W_k)}{(P_{fw} - P_f)}$$

For the mainlift range of extension of the mast 11, the calculation is as follows:

$$W = \frac{(P - P_m)(W_k)}{(P_{mw} - P_m)}$$

In the foregoing calculations, $P_f$ and $P_m$ are the values which were previously entered during steps 304 and 306, respectively, of the initialization sequence of FIG. 4A, while $P_{fw}$ and $P_{mw}$ are the values previously entered during steps 308 and 310. $W_k$ is the weight of the known load used during initialization and previously entered at step 312 of the initialization sequence.

After calculation of the load weight W at step 222 of FIG. 4D, the controller determines which predetermined clamp-force-to-load-weight ratio CF/W was previously selected by the operator at step 316 of FIG. 4B, and determines at step 224 of FIG. 4E the desired maximum clamp force CF by the equation:

$$CF = W(CF/W).$$

Having determined the desired maximum clamp force CF at step 224, the controller 70 determines the clamp factor X previously entered by the operator at step 320 and calculates the maximum fluid gripping pressure CP at step 226 by the equation:

$$CP = CF/X.$$

At step 228 the controller then adjusts the maximum pressure relief setting of valve 74 to the desired maximum fluid gripping pressure CP. This process repeats continuously until the controller determines that the actual fluid gripping pressure sensed by sensor 66 equals or exceeds the desired fluid gripping pressure CP, as indicated at step 230. The controller 74 then deactivates the solenoid 94 at step 212 and sets the valve 74 at step 214 to prevent manually activated pressure increases as described previously.

Instead of manual keyboard selections of different clamp-force-to-load-weight ratios at step 316 of FIG. 4B, or different initial threshold gripping pressures at step 302, different relationships between maximum gripping pressure and load weight to account for differences in fragility or stability of the load can be selected automatically in response to an electronic code reader 120 which senses characteristics of a load by reading a coded label on the load. Such variable relationships can also be selected automatically by a proximity sensor 122 which senses the distance between the load-engaging surfaces of the clamp arms to determine the size of the load being gripped. Accordingly, different types of predetermined relationships between fluid gripping pressure and load characteristics are contemplated by the present invention, as well as different types of mechanisms for selecting such different relationships.

After initial automatic regulation of the gripping pressure during initial clamp closure, the system continually senses whether the clamped load is being supported by the clamp by comparing the hoist pressure sensed by sensor 92 with the appropriate unloaded static hoist pressure $P_{fs}$ or $P_{ms}$ previously stored at steps 313 and 314, depending on whether the switch 219 is closed, as indicated at step 240. As long as the hoist pressure at sensor 92 is greater than the appropriate stored unloaded static hoist pressure, indicating at step 242 of FIG. 4F that the operator has not set the load down, the system repeatedly recalculates the desired fluid gripping pressure CP as before, and compares it to the actual fluid gripping pressure at sensor 66. In the comparison at step 244, the system determines whether the actual fluid gripping pressure is at least a predetermined percentage (such as 95%) of what it should be. If not, the system automatically readjusts the relief setting of the valve assembly 74 upwardly to the new desired maximum fluid gripping pressure CP and readjusts the fluid gripping pressure and resultant gripping force, beginning at step 218 of FIG. 4C, by recalculating the gripping pressure CP and reactivating the solenoid valve 94. On the other hand, if the actual fluid gripping pressure is still within the predetermined percentage at step 244, the controller merely continues to recalculate and compare the actual fluid gripping pressure, without also readjusting it. This automatic repetitive monitoring and correction of the fluid gripping pressure and resultant gripping force corrects for such variables as leakage in the clamp cylinders 32 which could decrease the gripping force, or the possibility that the load was not fully supported by the clamp during the initial automatic regulation of the gripping pressure. The priority flow from the priority flow control valve 49, and the parallel exhaust line 48, insure the reliability of the continuous gripping-force correction feature, even though the clamp control valve 36 is in its centered, unactuated condition.

Figure 4F:
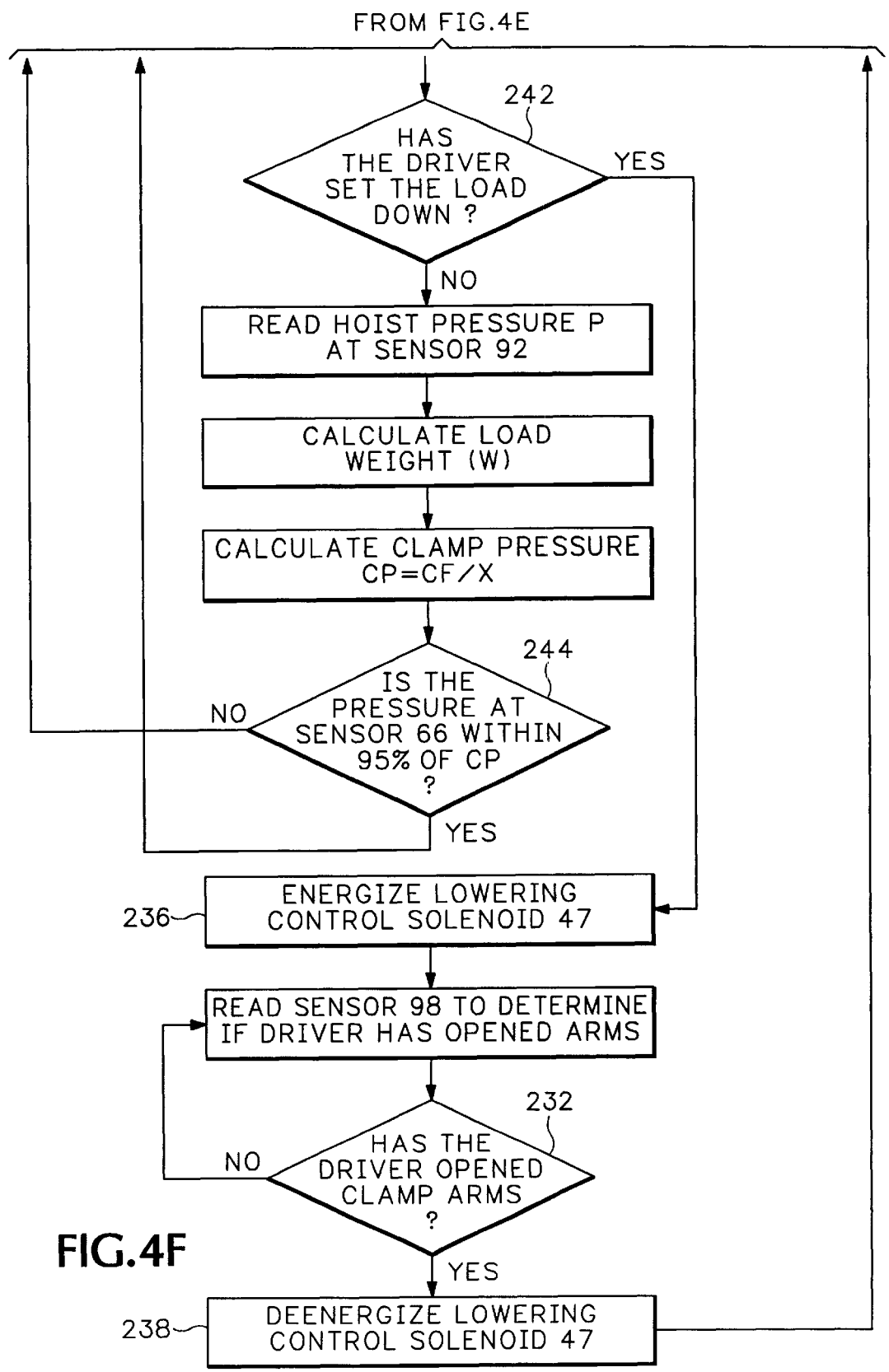

The foregoing repetitive monitoring and, if necessary, correction operation continues until the system senses, at step 242 of FIG. 4F, that the operator has set the load down. Thereafter, once the operator has opened the clamp, as sensed at step 232 by a pressure rise at sensor 98, the load clamping sequence returns to its origin at step 200 of FIG. 4C where the relief pressure of valve 74 is reset at the relatively high level needed for high speed closure, as described previously.

To minimize the possibility of setting a fragile load down onto a supporting surface in a tilted attitude such that the edge of the load would be damaged, a gravity-referenced tilt sensor 124 is optionally mounted on the base frame 15 of the clamp 10 to determine whether or not the load is tilted forwardly or rearwardly with respect to gravity and to cause the controller 70 to automatically adjust the load to a level attitude by corrective solenoid actuation of the tilt control valve 82. Mounting the gravity-referenced tilt sensor 124 on the clamp structure, rather than on the mast 11, allows the sensor to determine whether or not the load is tilted with respect to gravity irrespective of any tilting of the mast 11 due to mast deflection or other factors. The gravity-referenced sensor is also independent of whether or not the lift truck is level with respect to its supporting surface, or whether or not such surface is level. However, despite its foregoing advantages, the gravity-referenced sensor 124 is also susceptible to instability and long settling times if subjected to dynamic disturbances during lift truck travel, such as acceleration or braking, or vertical dynamic disturbances caused by ramps or uneven surfaces. For this reason, the controller 70 actuates the tilt control valve 82 correctively only in response to a decrease in load-weight detected by pressure sensor 92 (i.e. a negative pressure slope) in response to lowering of the load by the mast 11 to set the load down. During such lowering of the load, dynamic disturbances are minimized due to stoppage of the lift truck.

Another problem which can lead to load damage while setting the load down onto a supporting surface is the possibility that the operator may continue to lower the mast 11 after the load has been set down but before the operator has opened the clamp arms. In such case, the chains of the mast which normally support the clamp will become slack because the clamp is then supported by the clamped load rather than the mast. Thereafter, when the operator finally opens the clamp arms to disengage the load, the load engaging surfaces of the clamp arms slide down the surfaces of the load, causing external damage to fragile loads such as paper rolls. To minimize the possibility of such damage a solenoid valve 47 down-stream of a priority flow control valve 45 is preferably provided so as to be automatically controlled by the controller 70, in response to the setting down of a clamped load, to prevent further lowering of the mast until after the clamp arms have been opened to disengage the load. In the normal lowering mode, fluid flows through the priority path of the priority flow control valve 45, and flows through conduit 84 and hoist control valve 80, in its lowering position, through line 56 to the reservoir 38. The priority flow control valve 45 is of a design where the priority flow requirements must be satisfied before the valve will permit any flow to bypass through its excess flow port and the excess flow conduit 51. With reference to FIG. 4E, when the controller 70 detects through sensor 92 at step 240 that the hoist pressure has declined to a level equal to or less than the unloaded static pressure $P_{fs}$ or $P_{ms}$, this indicates that a clamped load has been set down on a supporting surface. Accordingly, pursuant to step 242 of FIG. 4F the controller 70 activates the solenoid valve 47 at step 236 thereby blocking the priority flow path. Without the priority flow condition being fulfilled, the priority flow control valve 45 blocks excess flow from returning to the reservoir alternatively through conduit 51 and thereby prevents the mast from lowering further. When the clamp is subsequently opened, as automatically determined at step 232 by sensing a pressure rise at sensor 98, the controller deactivates the solenoid valve 47 at step 238, and the mast and clamp can thereafter be further lowered by the operator without damaging the load. During lowering of the mast 11, an optional restrictor 55 can be employed to limit lowering speed to maintain the accuracy of the pressure sensed by sensor 92 even if the operator opens the lowering control valve rapidly and fully. The foregoing lowering prevention system is also applicable to other types of loads and load-engaging structures, such as forks, to prevent free-fall of the load-engaging structure when disengaged from the load.

The foregoing lowering prevention system can alternatively be implemented without the priority flow control valve 45 and excess flow conduit 51 by employing a solenoid valve 47 capable of a larger volumetric flow rate.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A load-handling apparatus comprising:

(a) a load-engaging structure;

(b) a selectively liftable and lowerable lifting mechanism to selectively lift and lower said load-engaging structure, said lifting mechanism having an electrical controller automatically operable, in response to lowering of said load onto a supporting surface, to prevent lowering of said lifting mechanism;

(c) said lifting mechanism having an elongate, longitudinally-extensible structure operable to support the weight of said load longitudinally by means of at least one reactive force in said mechanism which is variably dependent upon the longitudinally-extensible position of said mechanism, said lowering controller being operable to detect, from said reactive force, said lowering of said load onto said supporting surface independently of changes in said longitudinally-extensible position of said mechanism effective to vary said reactive force.

2. The apparatus of claim 1 wherein said load-handling structure is a clamp.

3. The apparatus of claim 1 wherein said lifting mechanism includes a variable lowering speed controller, and a lowering speed limiter operable independently of said lowering speed controller.

4. A load-handling clamp having selectively closable and openable load-engaging surfaces for selectively gripping and releasing a load positioned between said surfaces, said clamp comprising:

a) at least one power actuator connected to at least one of said surfaces for selectively closing and opening said surfaces relative to each other to selectively grip and release said load;

b) a selectively liftable and lowerable lifting mechanism to selectively lift and lower said load, said lifting mechanism having an electrical lowering controller automatically operable, in response to a deposit of said load onto a supporting surface, to prevent lowering of said lifting mechanism continuously from said deposit until said load-engaging surfaces have been opened to disengage said load;

c) said lowering controller being responsive to a first sensor operable to detect said deposit of said load onto said supporting surface, and a second sensor separate from said first sensor operable to detect that said load-engaging surfaces have been opened to disengage said load.

* * * * *